(12) United States Patent
Stephens et al.

(10) Patent No.: US 7,097,669 B2
(45) Date of Patent: Aug. 29, 2006

(54) COLORANT COMPOSITIONS

(75) Inventors: Eric B. Stephens, Spartanburg, SC (US); Pat Moore, Pacolet, SC (US)

(73) Assignee: Milliken & Company, Spartanburg, SC (US)

( * ) Notice: Subject to any disclaimer, the term of this patent is extended or adjusted under 35 U.S.C. 154(b) by 89 days.

(21) Appl. No.: 10/992,066

(22) Filed: Nov. 18, 2004

(65) Prior Publication Data

US 2006/0101593 A1     May 18, 2006

(51) Int. Cl.
*C09B 11/10*     (2006.01)
*C09B 69/10*     (2006.01)
*C11D 7/40*     (2006.01)

(52) U.S. Cl. .................. 8/512; 8/525; 8/552; 8/647; 8/680; 525/452; 552/101; 552/111; 552/112; 552/114; 510/461; 510/494; 510/495; 510/496; 510/502; 510/506

(58) Field of Classification Search .............. 552/101, 552/111, 112, 114
See application file for complete search history.

(56) References Cited

U.S. PATENT DOCUMENTS

| | | | |
|---|---|---|---|
| 3,927,044 A | 12/1975 | Foster et al. | 260/394 |
| 4,113,721 A | 9/1978 | Hauser et al. | 260/178 |
| 4,141,684 A | 2/1979 | Kuhn | 8/39 R |
| 4,284,729 A | 8/1981 | Cross et al. | 521/158 |
| 4,595,536 A | 6/1986 | Hung et al. | 260/394 |
| 4,632,783 A | 12/1986 | Hung et al. | 260/394 |
| 4,871,371 A | 10/1989 | Harris | 8/403 |
| 5,043,013 A * | 8/1991 | Kluger et al. | 106/31.32 |
| 5,591,833 A | 1/1997 | Hines et al. | 534/607 |
| 6,342,618 B1 | 1/2002 | Harris | 552/101 |
| 6,395,797 B1 | 5/2002 | Ragsdale et al. | 521/130 |
| 6,479,647 B1 * | 11/2002 | Batlaw | 534/729 |
| 6,764,541 B1 | 7/2004 | Banning et al. | 106/31.29 |

OTHER PUBLICATIONS

The Chemistry of Synthetic Dyes vol. IV by Academic Press—1971.
Triarylemethane Dyes Among the 2,2,4-Trimethylhydroquinolines Khimiya I khimicheskaya tekhnologiya, 1999, vol. 42, No. 4, pp. 83-87.
Concurrently filed "Colorant Compositions", filed Nov. 18, 2004; Stephens et. al., Milliken Case No. 5824, U.S. Appl. No. 10/991,655.
Developments in the Chemistry and Technology of Organic Dyes, J. Griffiths, Published 1984.

* cited by examiner

*Primary Examiner*—Margaret Einsmann
(74) *Attorney, Agent, or Firm*—Terry T. Moyer; John E. Vick, Jr.

(57) ABSTRACT

Colorant compositions are useful for a wide variety of product applications. For example, colorants are used in tinting of polymers, providing colors to aqueous solution(s), and affording color to solid or semi-solid products such as detergents. Disclosed herein are colorant compositions having a triphenylmethane ("TPM") derived structure having improved stability to alkaline conditions. Thus, the colorant compositions resist decolorization, even at relatively high pH levels. The colorant compositions of the invention are useful as applied in polyolefins, such as polypropylene and polyethylene, as examples. These colorant compositions also may be employed in thermoplastics, such as PET, for example.

12 Claims, No Drawings

COLORANT COMPOSITIONS

FIELD OF THE INVENTION

This invention relates to surprisingly effective triphenylmethane colorant compositions, which exhibit low color degradation in alkaline media.

BACKGROUND OF THE INVENTION

Colorant compositions are useful for a wide variety of product applications. For example, colorants are used in tinting of polymers, for providing coloration to aqueous solution(s), and affording color to solid or semi-solid products such as detergents. Crayons, ink compositions, toilet bowl colorants, plastics, soaps, and many other products are colored using triphenylamine-based colorant compositions.

Triphenylmethane ("TPM") colorants consist of three aromatic rings linked by a central carbon atom. TPM colorants can be prepared by first condensing an aromatic aldehyde with two equivalents of an aromatic amine (which will hereafter be referred to as the "coupler" or "coupling component") in the presence of an acid such as sulfuric acid, phosphoric acid, or muriatic acid. After condensation, the uncolored intermediate is oxidized using a variety of oxidizing agents (hydrogen peroxide, lead oxide, chromium oxide) to afford the TPM colorant. Variations in the substitution patterns on either the aldehyde or the coupler molecules can change slightly the wavelength of light absorbed, thus providing a different color to the colorant species. The substitution of groups in this manner is highly unpredictable. A large amount of effort may be expended to find the right molecular combination to provide the most appropriate color shade for a given application.

One problem with TPM colorants is inadvertent or undesirable discoloration. This may occur if an undesirable chemical reaction occurs to the colorant molecular species. In the case of TPM based colorants, nucleophilic groups such as OH— or certain basic amine. groups may react with and undesirably decolorize or shift the shade of such colorants. It is known that at elevated pH levels, TPM based colorants are subject to hydroxyl (OH—) attack. These reactions may undesirably decolorize or change the shade of the colorant molecule. Thus, it would be highly desirable to develop compositions, methods, or techniques that could be used for affording color in such product applications while providing a high level of stability in alkaline environments as well. This ensures that adequate color remains, even under alkaline conditions.

Discoloration of TPM colorants and or dyes has been addressed in a number of patents, some of which are discussed below.

The Ragsdale patent (U.S. Pat. No. 6,395,797), discloses organic cyclic ester additives formulated with TPM colorants to reduce color degradation in polyurethane foam systems caused by certain tertiary amine catalyst.

In Harris (U.S. Pat. No. 6,342,618), TPM colorants containing sterically hindered fugitive amine counterions employed to improve stability of such colorants in inks. The Triphenylmethane polymeric colorants are capped with a cyclic anhydride. The sterically hindered amine counter ions are those based on low molecular weight fugitive tertiary amines, such as N,N-dimethylethanolamine.

U.S. Pat. No. 3,927,044 (Foster et al.) discloses alkaline stable fugitive tints prepared using aromatic aldehydes containing an electron-withdrawing group (X) in the ortho-position. These fugitive tints are prepared with highly ethoxylated aromatic amines. The tints are said to exhibit improved lightfastness and provide some degree of alkaline stability.

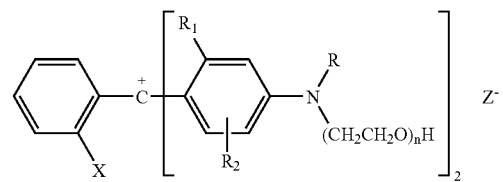

Stability is defined in this Foster patent disclosure as the ability to retain color in an alkaline solution at a pH level of 11. The X in the structure represents the electron-withdrawing group in the ortho position and may include halogen, nitro, or sulfonyl radicals.

U.S. Patent Publication No. 2004/0143910 A1 discloses the use of certain triphenylmethane dyes as hair colorants, which are resistant to decolorization in alkaline bleach medium. This patent teaches that TPM dyes containing deactivating (electron withdrawing) or weakly activating groups substituted at the ortho- and/or para-positions relative to the central methane carbon and/or auxochrome groups (located on or attached to the aromatic rings of the TPM) have enhanced survival in alkaline bleach medium. As more and more groups are added to the rings, stability increases proportionally, so that dyes with the most substituents on all three aromatic rings are the most stable. These deactivating and protective groups may be nitro, halogen, cyano, carboxyl, sulfonic, alkyl, or aromatic groups, but not amino, hydroxy, alkoxy or alkylamide groups. In this patent auxochromes are defined as weakly basic groups such as hydroxy or amino groups. If the auxochrome is an amino group, it may be a primary amino group (—NH$_2$), a secondary amino group (—NHR$_1$), or a tertiary amino group (—NR$_2$) where R$_1$ and R$_2$ may be identical or different, and either may be alkyl, alkoxy, carboxy, cyano, alkyl cyano, halogen, phenyl, or naphthyl substituent.

U.S. Pat. No. 4,595,536 (Hung et al) discloses TPM dyes of the structure shown below.

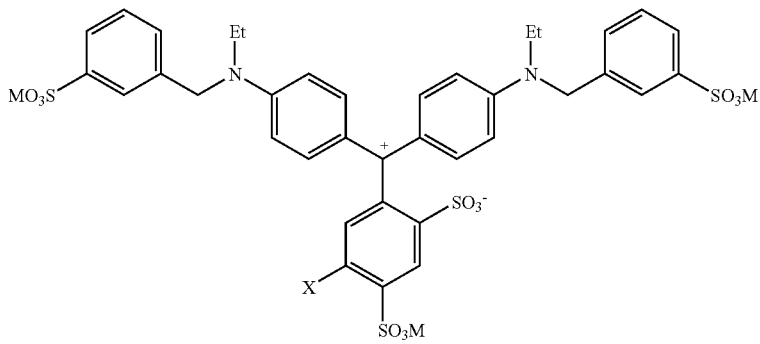

These dyes are reported to be resistant or stable enough to sanitizing agents, which produce hypochlorite in aqueous solutions, that they can be used in automatic toilet bowl sanitizers. In this patent disclosure, X represents hydrogen or hydroxy. M represents an alkali metal cation, an ammonium ion, or an alkaline earth metal cation.

An additional patent by Hung et al, U.S. Pat. No. 4,632,783 discloses TPM dyes of the structure shown below.

based carbon of the aromatic aldehyde group forms the central carbon of the triphenylamine-based structure that is formed.

Shikhaliev et al (Khimiya I Khimicheskaya Tekhnologiya, 1999, Vol. 42, No. 4, pp 83–87) reported the preparation and spectral properties of the following TPM dyes of the structure shown below where $R_1$ is H or $NMe_2$ and R is H or Me.

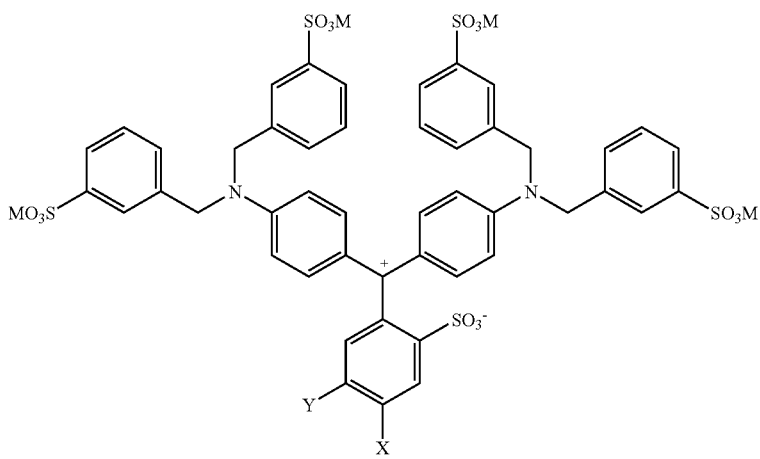

These dyes are reported to be resistant or stable enough to serve as sanitizing agents, which produce hypochlorite in aqueous solutions. They can be used in automatic toilet bowl sanitizers. In this patent, X represents hydrogen or the group SO3M. Y represents hydrogen or hydroxy. M represents an alkali metal cation, an ammonium cation, or an alkaline earth metal cation.

U.S. Patent No. 2004/0214918 A1 (Banning et al.) is directed to colorant compositions having aromatic ring structures with an attached nitrogen, in which the nitrogen is substituted with an R group, and also with an alkylene oxide containing structure. The R group may be alkyl, aryl, arylalkyl or an alkylaryl group. Further, the R group may be joined to the phenyl moiety to form a bicylic structure. The overall triphenyl-based structure proposed in this patent contains one alkylene oxide chain $(C_nH_{2n}O)_xH$ attached to the nitrogen. This alkylene oxide chain is derived from its presence on the aromatic aldehyde that is reacted two other phenyls to form the triphenyl-based structure. The non-ring

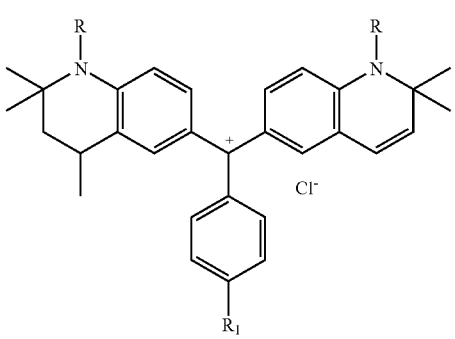

U.S. Pat. No. 5,591,833 to Hines et al is directed to fugitive tint materials that are more easily removed from yarns without scouring the yarns. The Hines patent discloses colorants and compositions useful as fugitive or permanent colorants for a variety of substrates, and having one or more improved properties, such as: enhanced aqueous washability, reduced staining, compatibility with and non-extractability from thermoplastic resins, and reactivity with resins having reactive functionality.

The compositions disclosed in Examples 63, 64, and 65 of the Hines patent incorporate long chain ethylene oxide (EO) residues containing at least two glycidols (denoted "GL" in the patent) attached to nitrogen. Example 63 contains two "H-50 EO/2GL-" groups, while Examples 64 and 65 disclose two "H-10 EO/2GL-" and two "H-50EO/2GL-" groups, respectively, attached to separate nitrogens annexed to a triphenylmethane-based compound. Hines discloses using between 2 and 6 glycidol residues attached to a nucleophilic site.

DETAILED DESCRIPTION OF THE INVENTION

Reference now will be made to the embodiments of the invention, one or more examples of which are set forth below. Each example is provided by way of explanation of the invention, not as a limitation of the invention. In fact, it will be apparent to those skilled in the art that various modifications and variations can be made in this invention without departing from the scope or spirit of the invention.

In the practice of the invention, novel chemical compositions and methods of applying such chemical compositions are provided. A TPM-based colorant is provided that is stable in alkaline detergent systems as well as polyurethane systems that employ basic catalysts, including polyurethane foams. The colorant compositions of the invention are useful in polyolefins, such as polypropylene and polyethylene, as examples. These colorant compositions also may be employed in thermoplastics, such as PET, for example.

TPM based compositions of the invention employ a coupler wherein the nitrogen atom of the aromatic amine is substituted with hindered glycidyl ethers such as tert-butyl glycidyl ether, isopropyl-glycidyl ether, isobutyl glycidyl ether, hexadecyl glycidyl ether, glycidyl methyl ether, 2-ethylhexyl glycidyl ether, or hindered epoxides such as styrene oxide. By using a coupler wherein this nitrogen is substituted by sterically bulky glycidyl ethers or epoxides, the likelihood that the TPM colorant will undergo decolorization due to attack by a nucleophile (such as OH— or an amine) is reduced dramatically and the stability of the colorant is improved. This is an unexpected and significant discovery.

The use of couplers or aldehydes containing groups that increase the steric hinderance in and around the central carbon of the TPM based structure can also be employed in conjunction with the coupling components containing the sterically hindered aromatic amine nitrogen. Such additional steric hindrance can improve the stability further, but is not always necessary.

The use of aromatic aldehydes containing para-substituted amines may also be incorporated into the TPM composition. This, in general, allows one to obtain more violet to red shades of blue. The amine on the aldehyde component is substituted with alkylene oxide residues consisting of either propylene oxide, butylene oxide, styrene oxide, t-butyl glycidyl ether, isopropyl glycidyl ether, isobutyl glycidyl ether, 2-ethylhexyl glycidyl ether, glycidyl hexadecyl ether, glycidyl methyl ether or mixtures thereof.

The amine on the aldehyde optionally may be incorporated into a heterocycle as in the case of the structure shown below. In this case the amine is additionally substituted with an alkyl group or styrene oxide, t-butyl glycidyl ether, isopropyl glycidyl ether, isobutyl glycidyl ether, 2-ethylhexyl glycidyl ether, glycidyl hexadecyl ether, or glycidyl methyl ether.

In one application of the invention, a composition as presented below may be provided. For purposes of this disclosure (and claims herein), $F_1$–$F_{10}$ refer to various chemical species as defined herein, and do not refer to fluorine.

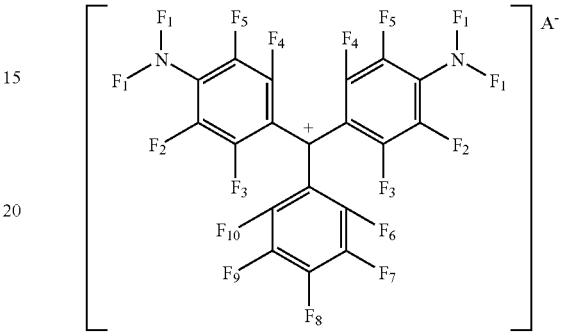

wherein $F_1=(B)_x(C)_yH$ wherein B is an alkylene oxide residue consisting of either styrene oxide, glycidyl methyl ether, isobutyl glycidyl ether, isopropylglycidyl ether, t-butyl glycidyl ether, 2-ethylhexylglycidol ether, or glycidyl hexadecyl ether and x is an integer from 1–20 representing the number of repeat alkylene oxide units.

C is an alkylene oxide residue consisting of ethylene oxide, propylene oxide, butylene oxide, styrene oxide, glycidyl methyl ether, isobutyl glycidyl ether, isopropyl glycidyl ether, t-butyl glycidyl ether, 2-ethylhexyglycidol ether, or glycidyl hexadecyl ether, or mixtures thereof, and y is an integer less than about 20;

wherein $F_2$, $F_3$, $F_4$, $F_5$, $F_6$, $F_7$, $F_9$, and $F_{10}$ each are independently selected from the group consisting of: hydrogen, alkyl, alkoxy, $SO_3^-$, $SO_3Na$, $SO_3K$, sulfonamide, acetamide, nitro, and cyano;

wherein $F_8$ is selected from the group consisting of: hydrogen, alkyl, alkoxy, $SO_3^-$, $SO_3Na$, $SO_3K$, sulfonamide, acetamide, nitro, and cyano, and a nitrogen-bound alkylene oxide moiety;

wherein said $F_8$ comprises said nitrogen-bound alkylene oxide moiety, the nitrogen bound alkylene oxide moiety is represented by:

$N[(D)_y(E)_z]_2H$ wherein

N is nitrogen;

D represents an alkylene oxide residue, said alkylene oxide residue being selected from the group consisting of: styrene oxide, t-butyl glycidyl ether, isopropyl glycidyl ether, isobutyl glycidyl ether, 2-ethylhexyl glycidyl ether, glycidyl hexadecyl ether, and glycidyl methyl ether;

y is an integer between 1 and about 20; and

E represents an alkylene oxide residue selected from the group consisting of: ethylene oxide, propylene oxide, buty lene oxide, styrene oxide, t-butyl glycidyl ether, isopropyl glycidyl ether, isobutyl glycidyl ether, 2-ethylhexyl glycidyl ether, glycidyl hexadecyl ether, glycidyl methyl ether; and z represents an integer less than about 20; and further wherein said $F_6$ and said $F_7$ may or may not be linked together to form a heterocyclic or aromatic ring;

further wherein said $F_7$ and said $F_8$ may or may not be linked together to form a heterocyclic or aromatic ring; and wherein A– comprises an anion when said colorant composition does not contain $SO_3^-$.

In at least one application of the invention, at least four —OH groups will reside upon the colorant molecule by terminating each $F_1$ group. Many applications provide more than four of such OH groups per molecule.

The terminal —OH groups may or may not be capped with acetate groups, or urethanes.

Synthesis of Colorant Compositions

The synthesis of the inventive colorant compositions may be by several methods, described below. The invention and the scope of the claims are not limited to any particular method of making the composition.

The coupling components wherein the aromatic amine is reacted with "hindered" glycidyl ethers are prepared as follows.

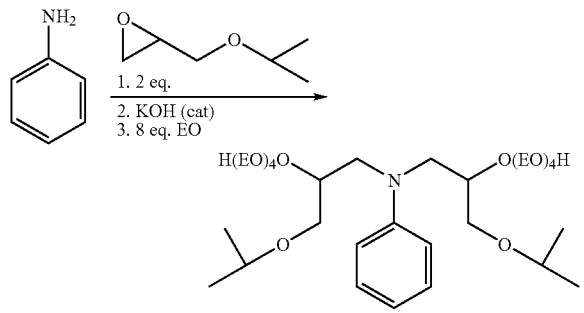

Aniline 2 (isopropyl glycidyl ether or iPrGE) 8 EO was prepared in the following manner. To a clean, dry 1 L 3-neck flask equipped with a stir rod, thermometer, condenser, and $N_2$ inlet was added at room temperature Aniline (200 g)(available from Aldrich Chemical Co, Milwaukee, Wis.). Five drops of formic acid were then added. The contents were stirred and heated to 130 C. At 130 C was added 542 g of isopropyl glycidyl ether (available from Aldrich Chemical Co, Milwaukee, Wis.). The reaction mixture was post-cooked at 145 C for 4 hours to give the Aniline 2iPrGE intermediate as a straw colored liquid.

Four hundred grams of the Aniline 2iPrGE intermediate was placed in a 1-gallon stainless steel pressure reactor equipped with an agitator, gas inlet tube, and vent. Potassium hydroxide flake (1.5 g) was then added to the reactor. After purging with $N_2$, the reactor and contents were stripped at 200 C for 15 minutes. Ethylene oxide was then added into the reactor until 8 equivalents or 433 g were consumed. The reaction was post reacted for 30 minutes then cooled to ambient temperature to give the product Aniline 2iPrGE 8EO as an amber colored liquid.

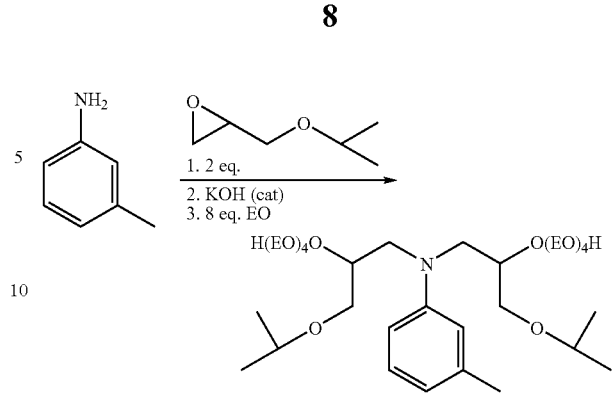

mToluidine 2 (isopropyl glycidyl ether or iPrGE) 8 EO was prepared in the following manner. To a clean, dry 1 L 3-neck flask equipped with a stir rod, thermometer, condenser, and $N_2$ inlet was added at room temperature mToluidine (200 g)(available from Aldrich Chemical Co, Milwaukee, Wis.). The contents were stirred and heated to 130 C At 130 C was added 465 g of isopropyl glycidyl ether (available from Aldrich Chemical Co, Milwaukee, Wis.). The reaction mixture was post-cooked at 145 C for 4 hours to give the mToluidine 2iPrGE intermediate as a straw colored liquid.

Six hundred and eighteen grams of the m-Toluidine 2iPrGE intermediate was placed in a 1-gallon stainless steel pressure reactor equipped with an agitator, gas inlet tube, and vent. Potassium hydroxide flake (2 g) was then added to the reactor. After purging with $N_2$, the reactor and contents were stripped at 200 C for 15 minutes. Ethylene oxide was then added into the reactor until 8 equivalents or 640 g were consumed. The reaction was post reacted for 30 minutes then cooled to ambient temperature to give the product mToluidine 2iPrGE 8EO as an amber colored liquid.

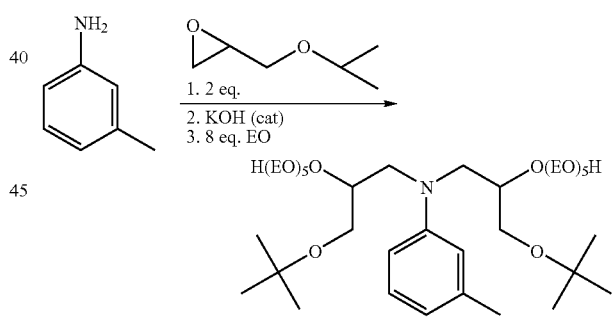

mToluidine 2 (tert butyl glycidyl ether) 10 EO was prepared in the following manner. To a clean, dry 1 L 3-neck flask equipped with a stir rod, thermometer, condenser, and $N_2$ inlet was added at room temperature mToluidine (100 g)(available from Aldrich Chemical Co, Milwaukee, Wis.). Five drops of formic acid was then added and the contents stirred and heated to 120 C. At 120 C was added 290 g of tert-butylglycidoyl ether (available from Aldrich Chemical Co, Milwaukee, Wis.). The reaction mixture was post-cooked at 150 C for 4 hours to give the mToluidine 2TBGE intermediate as a straw colored wax. Three hundred and thirty grams of the m-Toluidine 2TBGE intermediate was placed in a 1-gallon stainless steel pressure reactor equipped with an agitator, gas inlet tube, and vent. Potassium hydroxide flake (1.5 g) was then added to the reactor. After purging with $N_2$, the reactor and contents were stripped at 200 C for 15 minutes. Ethylene oxide was then added into the reactor until 10 equivalents or 396 g were consumed. The reaction was post reacted for 30 minutes then cooled to ambient temperature to give an amber colored liquid.

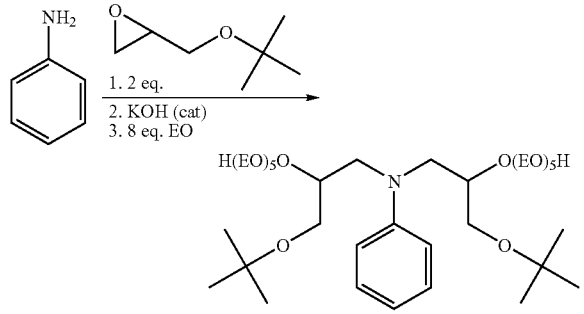

Aniline 2TBGE 10 EO (where TBGE is tert-butyl glycidyl ether) and EO is ethylene oxide was prepared in the following manner. To a clean, dry 1 L 3-neck flask equipped with a stir rod, thermometer, condenser, and N₂ inlet was added at room temperature aniline (100 g)(available from Aldrich Chemical Co, Milwaukee, Wis.). Five drops of formic acid was then added and the contents stirred and heated to 120 C. At 120 C was added 300 g of tert-butylglycidoyl ether (available from Aldrich Chemical Co, Milwaukee, Wis.). The reaction mixture was postcooked at 150 C for 4 hours to give the Aniline 2TBGE intermediate as a straw colored wax.

Three hundred and thirty grams of the Aniline 2TBGE intermediate was placed in a 1-gallon stainless steel pressure reactor equipped with an agitator, gas inlet tube, and vent. Potassium hydroxide flake (1.5 g) was then added to the reactor. After purging with N₂, the reactor and contents were stripped at 200 C for 15 minutes. Ethylene oxide was then added into the reactor until 10 equivalents or 408 g were consumed. The reaction was post reacted for 30 minutes then cooled to ambient temperature to give Aniline 2(TBGE) 10 EO as an amber colored liquid.

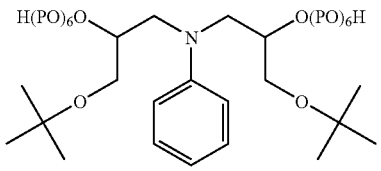

Aniline 2TBGE 12 PO where PO is propylene oxide is prepared in a manner analogous to the procedure above except that 714 g of PO or propylene oxide is used in place of the ethylene oxide.

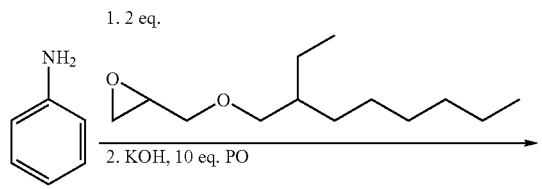

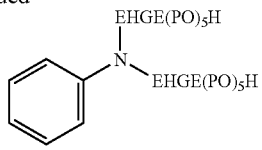

where EHGE is 2-ethylhexylglycidol

Aniline 2(EHGE) 10PO was prepared as follows. To a clean, dry 1000 mL 3-neck flask equipped with an agitator, thermometer, reflux condenser, and N₂ inlet was added aniline (96.5 g). The aniline was heated to 115–125 C and 2-ethylhexyl glycidol ether (415 g) was dripped in. After the addition, the reaction mixture was post cooked for 2 additional hours at 120 C. The product was allowed to cool to ambient temperature to give the product Aniline 2(EHGE) as a clear oil.

Three hundred fifty grams of Aniline 2(2EHGE) and 2 grams of potassium hydroxide were added to a 1-gallon stainless steel pressure reactor equipped with an agitator, gas inlet tube, and vent. After purging with nitrogen, the reactor and contents were heated to 200 F. Vacuum was applied for 15 minutes. The contents of the reactor were then heated to 250 F and propylene oxide was then added into the reactor until 10 equivalents or 332 g were consumed. The reaction was post reacted for 30 minutes then subjected to vacuum for 15 minutes. The reaction was then cooled to ambient temperature to give a straw colored liquid.

EXAMPLE 1

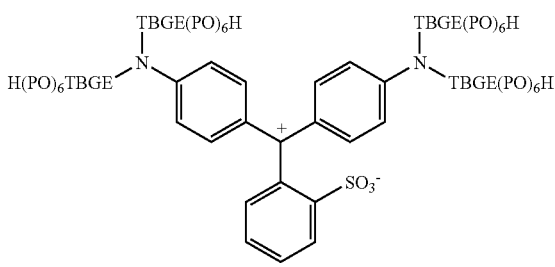

To a 3-neck 500 mL round bottom flask equipped with a condenser, thermometer and a nitrogen inlet was added water (3 g), 93% sulfuric acid (18 g), water (6 g), ortho-formylbenzene sulfonic acid sodium salt (21 g), Aniline 2TBGE 12PO (173.8 g), and urea (1.2 g). The ensuing mixture was heated to 100C for 3 hours under a nitrogen atmosphere. The reaction solution was then allowed to cool to 70C and ammonium meta-vanadate (0.2 g) was added. The ensuing reaction mixture was heated to 95–107C where a mixture of water (40g) and 35% hydrogen peroxide (40 g) was slowly added. After addition of the peroxide water solution, the reaction was poured into a separatory funnel and allowed to phase. The bottom aqueous layer was removed. Water (400 g) was then added to the product layer and the mixture heated to 70C. The solution was then allowed to phase separate. The bottom product layer was removed. Water (400g) was then added to the product layer and the pH adjusted to 7 with a 1:1 mixture of aqua ammonia and water. The mixture was heated to 65C then poured into a separatory funnel and allowed to phase separate. The bottom product layer was then removed. The product layer was then placed in a 1-neck flask and the residual water removed via a rotary evaporator to give a blue oil with a color value of 45.1 (measured with a Beckman DU 650 UV visible spectrophotometer; abs/g/L in Methanol) and a Max Abs of 635 nm in MeOH.

EXAMPLE 2

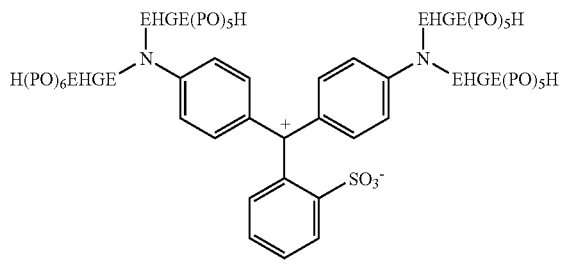

To a 3-neck 500 mL round bottom flask equipped with a condenser, thermometer and a nitrogen inlet was added water (3 g), sulfuric acid (9.0 g), ortho-formylbenzene sulfonic acid sodium salt (10.5 g), Aniline 2EHG 1OPO (114.2 g), and urea (0.6 g). The ensuing mixture was heated to 100C for 3 hours under a nitrogen atmosphere. The reaction solution was then allowed to cool to 70 C and ammonium meta-vanadate (0.1 g) was added. The ensuing reaction mixture was heated to 95–107C where a mixture of water (17 g) and 35% hydrogen peroxide (20 g) was slowly added. After addition of the peroxide water solution, the reaction was poured into a separatory funnel and allowed to phase. The bottom aqueous layer was removed. Water (250 g) was then added to the product layer and the mixture heated to 70C. The solution was then allowed to phase separate. The bottom product layer was removed. Water (250g) was then added to the product layer and the pH adjusted to 5.9 with a 1:1 mixture of aqua ammonia and water. The mixture was heated to 65C then poured into a separatory funnel and allowed to phase separate. The bottom product layer was then removed. This wash procedure was repeated one additional time with 250 g of water. The product layer was then placed in a 1-neck flask and the residual water removed via rotary evaporator to give a blue oil with a color value of 43.8 (measured with a Beckman DU 650 UV visible spectrophotometer; abs/g/L in Methanol) and a Max Abs of 634 nm in MeOH.

EXAMPLE 3

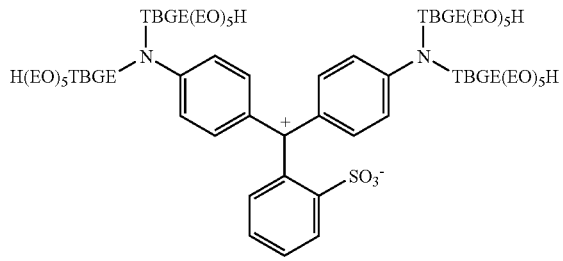

To a 3-neck 500 mL round bottom flask equipped with a thermometer and a N₂ inlet was added 93% sulfuric acid (6 g), ortho-formylbenzene sulfonic acid sodium salt (11.5 g), Aniline 2TBGE10 EO (89.6g), and urea (0.55 g). The ensuing mixture was heated to 95C for 3 hours under a N₂ atmosphere. The reaction solution was then allowed to cool to ambient temperature and ammonium meta-vanadate (0.44 g) was added. The ensuing reaction mixture was heated to 95–105C where a mixture of water (7.5 g) and 35% hydrogen peroxide (18.5 g) was slowly added. After addition of the peroxide water solution, the mixture was allowed to cool to ambient temperature. The pH was adjusted to 6.3 with a 1:1 mixture of aqua ammonia and water to give a green solution with a color value of 27.4 (measured with a Beckman DU 650 UV visible spectrophotometer; abs/g/L in Methanol) and a Max Abs of 634 nm.

EXAMPLE 4

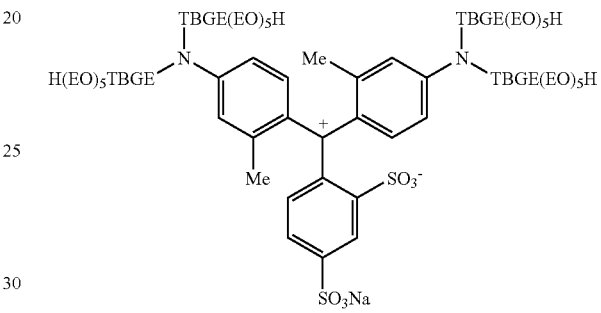

To a 3-neck 500 mL round bottom flask equipped with a thermometer and a N₂ inlet was added muriatic acid (2.6 g), water (6.1 g), ortho-formylbenzene sulfonic acid sodium salt (6.3 g), m-Toluidine 2TBGE10EO (33 g), and urea (0.2 g). The ensuing mixture was heated to 95C for 3 hours under a N₂ atmosphere. The reaction solution was then allowed to cool to 75 C and ammonium meta-vanadate (0.4 g) was added. The ensuing reaction mixture was heated to 90C where a mixture of water (5.1 g) and 35% hydrogen peroxide (5.9 g) was slowly added. After addition of the peroxide water solution, the mixture was allowed to cool to ambient temperature. The pH was adjusted to 6.3 with a 1:1 mixture of aqua ammonia and water to give a green solution with a color value of 13.3 (measured with a Beckman DU 650 UV visible spectrophotometer; abs/g/L in Methanol) and a Max Abs of 656 nm.

The formylated adduct of Aniline 2TBGE 10 EO is prepared in the following multi-step process depicted in the scheme below.

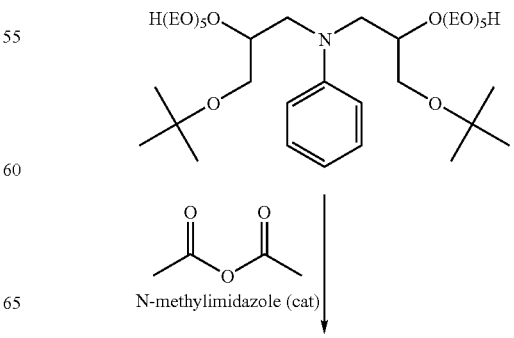

-continued

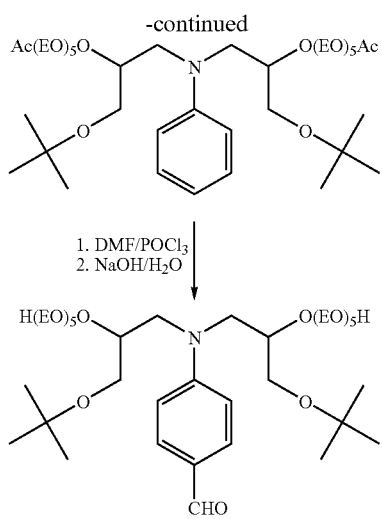

Acetylation of Aniline 2TBGE 10 EO to give Aniline 2TBGE 10EO diacetate was performed using the following procedure. To a 1 L 3-neck flask equipped with a thermometer, stirrer, condenser, and N₂ inlet was added Aniline 2TBGE 10 EO (400 g), acetic anhydride (129 g) and N-methylimidazole (1.5 g). The mixture was heated to 130 C for 3 hours under a N₂ atmosphere. The material was then stripped on a rotary evaporator to remove the acetic acid by-product to afford Aniline 2TBGE 10EO diacetate as a brown oil.

Formylation of Aniline 2TBGE 10 EO diacetate was performed using the following procedure. To a clean, dry 500 mL 3-neck round bottom flask with a stirrer, thermometer, and N₂ inlet was added dimethylformamide (80 g). The flask was cooled to 5 C under a N₂ atmosphere and phosphorus oxychloride (60 g) was slowly added such that the temperature did not exceed 15 C. The ensuing solution was stirred 15 minutes at 5–15 C then slowly added to a 1 L 3-neck flask containing Aniline 2TBGE 10 EO diacetate (250 g) at 5–30 C. under a N₂ atmosphere with good mixing. The ensuing reaction mixture was heated to 75–85 C for 2 hours then allowed to cool to 40–50 C The mixture was then slowly added to a stirring solution of water (393 g) and 50% sodium hydroxide (91 g) at 15–25 C. The mixture was then heated to 75 C and poured into a separatory funnel. The mixture was allowed to phase separate for 30 minutes. The bottom aqueous salt layer was removed. The top product layer was drained into a 1 L 3-neck flask equipped with a stir rod, thermometer, and condenser. Water (143 g), 50% sodium hydroxide (50 g) and 45% potassium hydroxide (6.8 g) were then added and the mixture heated to 95 C while stirring for 3 hours. The solution was then allowed to cool to 40–50 C and the pH adjusted to 7.5 with 93% sulfuric acid. The mixture was then heated to 75 C, poured into a separatory funnel and allowed to phase separate. The bottom aqueous salt layer was removed to give the formylated aniline 2TBGE 10 EO product as a brown solution of 75% solids with a color value of 28.4 (measured with a Beckman DU 650 UV visible spectrophotometer; abs/g/L in Methanol) and a Max Abs of 340 nm.

EXAMPLE 5

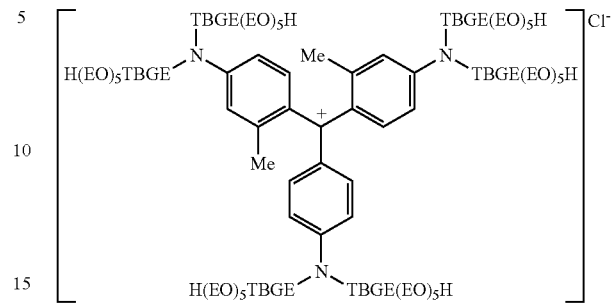

To a 3-neck 250 mL round bottom flask equipped with a condenser, thermometer and a N₂ inlet was added muriatic acid (8.0 g), formylated aniline 2TBGE 10 EO (31.2 g at 75% solids, m-Toluidine 2TBGE 8EO (61.7 g), and urea (0.3 g). The ensuing mixture was heated to 85–95C for 3 hours under a nitrogen atmosphere. The reaction solution was then allowed to cool to 55–60 C and ammonium meta-vanadate (0.55 g) was added. The ensuing reaction mixture was heated to 75C where a mixture of water (5.5 g) and 35% hydrogen peroxide (13 g) was slowly added. After addition of the peroxide water solution, the reaction was allowed to cool to 50 C and 140 g of additional water was added. The pH was adjusted to 5.5–6.5 with a 1:1 mixture of aqua ammonia and water to give a blue solution with a color value of 5.6 (measured with a Beckman DU 650 UV visible spectrophotometer; abs/g/L in Methanol) and a Max Abs of 615 in MeOH.

The formylated adduct of Aniline 2iPrGE 8 EO is prepared using a procedure similar to the formylation above. The procedure is as follows.

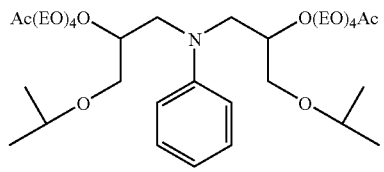

Acetylation of Aniline 2iPrGE 8EO to give Aniline 2iPrGE 8EO diacetate. To a 1 L 3-neck flask equipped with a thermometer, stirrer, condenser, and N₂ inlet was added Aniline 2iPrGE 8 EO(300 g), acetic anhydride (113 g) and N-methylimidazole (0.8 g). The mixture was heated to 130 C for 3 hours under a N₂ atmosphere. The material was then stripped on a rotary evaporator to remove the acetic acid by-product to afford Aniline 2iPrGE 8EO diacetate as a brown oil.

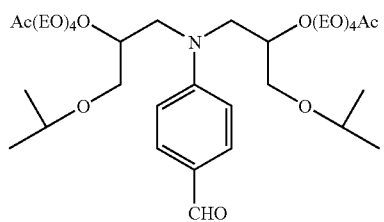

Formylation of Aniline 2iPrGE 8EO diacetate. To a clean, dry 500 mL 3-neck round bottom flask with a stirrer, thermometer, and N₂ inlet was added dimethylformamide (90 g). The flask was cooled to 5 C under a N₂ atmosphere and phosphorus oxychloride (70 g) was slowly added such that the temperature did not exceed 15 C. The ensuing solution was stirred 15 minutes at 5–15 C then slowly added to a 1 L 3-neck flask containing Aniline 2iPrGE 8EO diacetate (216 g) and acetic anhydride (1.5g) at 5–30 C under a N₂ atmosphere with good mixing. The ensuing reaction mixture was heated to 85–95 C for 2 hours then allowed to cool to 40–50 C. The mixture was then slowly added to a stirring solution of water (450 g) and 50% sodium hydroxide (212 g) at 15–25 C. The mixture was then heated to 75 C and poured into a separatory funnel. The mixture was allowed to phase separate for 30 minutes. The bottom aqueous salt layer was removed. The top product layer was drained into a 1 L 3-neck flask equipped with a stir rod, thermometer, and condenser. Water (200 g), 50% sodium hydroxide (58.0 g) and 45% potassium hydroxide (7 g) were then added and the mixture heated to 95 C while stirring for 3 hours. The solution was then allowed to cool to 40–50 C and the pH adjusted to 7.5 with 93% sulfuric acid. The mixture was then heated to 75 C, poured into a separatory funnel and allowed to phase separate. The bottom aqueous salt layer was removed to give the formylated Aniline 2iPrGE 8EO product as a 66.3% solids brown solution with a Max Abs of 343 nm.

EXAMPLE 6

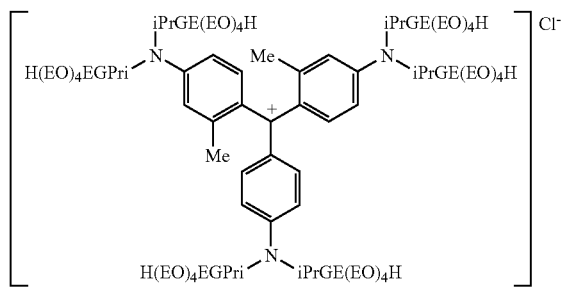

To a 3-neck 250 mL round bottom flask equipped with a condenser, thermometer and a N₂ inlet was added muriatic acid (8.0 g), formylated aniline 2iPrGE 8 EO (41.2 g at 66.3% solids, m-Toluidine 2iPrGE 8EO (54.6 g), and urea (0.3 g). The ensuing mixture was heated to 85–95C for 3 hours under a nitrogen atmosphere. The reaction solution was then allowed to cool to 55–60 C and ammonium meta-vanadate (0.5 g) was added. The ensuing reaction mixture was heated to 75C where a mixture of water (13 g) and 35% hydrogen peroxide (13 g) was slowly added. After addition of the peroxide water solution, the reaction was allowed to cool to 50 C and 140 g of additional water was added. The pH was adjusted to 6.4 with a 1:1 mixture of aqua ammonia and water to give a blue solution with a color value of 9.8 (measured with a Beckman DU 650 UV visible spectrophotometer; abs/g/L in Methanol) and a Max Abs of 617 in MeOH.

The following examples are not considered within the scope of the invention but were made as comparative examples for testing purposes.

COMPARATIVE EXAMPLE A

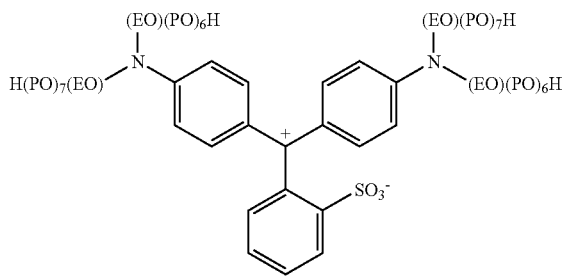

To a 3-neck 500 mL round bottom flask equipped with a thermometer and a nitrogen inlet was added 93% sulfuric acid (5.7 g), water (7.5 g), ortho-formylbenzene sulfonic acid sodium salt (11.5 g), Aniline 2EO 13PO (100 g), and urea (0.6 g). The ensuing mixture was heated to 95C for 3 hours under a nitrogen atmosphere. The reaction solution was then allowed to cool to ambient temperature and ammonium meta-vanadate (0.44 g) was added. The ensuing reaction mixture was heated to 95C where a mixture of water (7.5 g) and 35% hydrogen peroxide (18.5 g) was slowly added. After addition of the peroxide water solution, the solution was allowed to phase separate. A bottom aqueous layer was removed. To the product layer was added 200 g of water. The pH was adjusted to 7 with a 1:1 mixture of aqua ammonia and water. The mixture was then heated to 70 C and allowed to phase separate. The bottom product layer was removed and the wash procedure repeated. The final product layer was stripped via rotary evaporator to remove residual water to give a blue oil with a color value of 50 (measured with a Beckman DU 650 UV visible spectrophotometer; abs/g/L in Methanol) and a Max Abs of 628 nm in MeOH.

COMPARATIVE EXAMPLE B

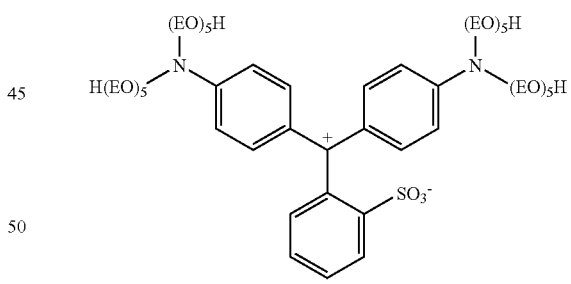

To a 4-neck 1000 mL round bottom flask equipped with a thermometer, condenser, stirrer and a N₂ inlet was added muriatic acid (36.5 g), water (4.8 g), ortho-formylbenzene sulfonic acid sodium salt (21.7g), Aniline 10EO (110.8 g), and urea (2.2 g). The ensuing mixture was heated to 95 C for 3 hours under a N₂ atmosphere. The reaction solution was then allowed to cool to 75 C and ammonium meta-vanadate (0.14 g) was added. The ensuing reaction mixture was heated to 95 C where a mixture of water (21 g) and 35% hydrogen peroxide (21 g) was slowly added. After addition of the peroxide water solution, the mixture was allowed to cool to ambient temperature. The pH was adjusted to 4.3 with 50% sodium hydroxide solution. Water (137 g) was then added to give a blue solution with a color value of 37

(measured with a Beckman DU650 UV visible spectrophotometer; abs/g/L in Methanol) and a Max Abs of 628 nm.

COMPARATIVE EXAMPLE C

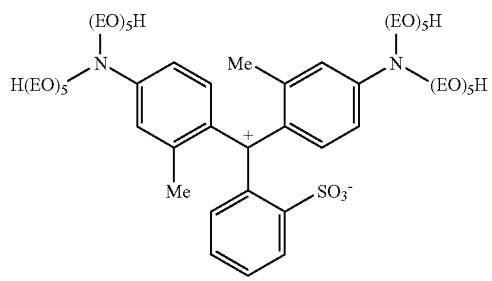

To a 3-neck 500 mL round bottom flask equipped with a thermometer and a $N_2$ inlet was added muriatic acid (10.3 g), water (22 g), ortho-formylbenzene sulfonic acid sodium salt (15.4), m-Toluidine 10EO (81.1 g), and urea (0.6 g). The ensuing mixture was heated to 95 C for 3 hours under a $N_2$ atmosphere. The reaction solution was then allowed to cool to 75 C and ammonium meta-vanadate (0.4 g) was added. The ensuing reaction mixture was heated to 90 C where a mixture of water (21 g) and 35% hydrogen peroxide (21 g) was slowly added. After addition of the peroxide water solution, the mixture was allowed to cool to ambient temperature. The pH was adjusted to 5.7 with a 1:1 mixture of aqua ammonia and water to give a green solution with a color value of 7.1 (measured with a Beckman DU 650 UV visible spectrophotometer; abs/g/L in Methanol) and a Max Abs of 648 nm.

COMPARATIVE EXAMPLE D

Xylene cyanol FF (Aldrich Chemical Co., Milwaukee, Wis.) will be used in stability test as comparative example E. The structure is below.

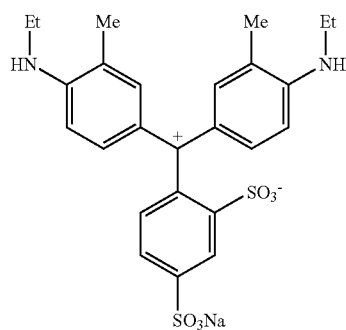

COMPARATIVE EXAMPLE E

Acid Violet 17 (Aldrich Chemical Co., Milwaukee, Wis.) will be used in stability test as comparative example E.

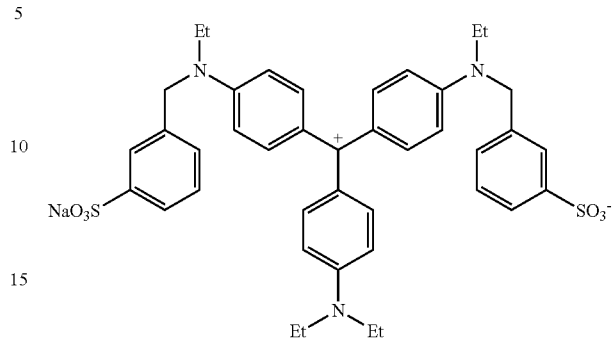

In order to test the improved stability of the inventive colorants to basic amine catalyst in polyurethane foam, the following test was performed using the colorants described above. These inventive colorants were tested against comparative example A prepared using coupling components containing ethylene oxide residues attached directly to the nitrogen of the coupler.

In these test, the TPM colorants were mixed with other poly-(oxyalkylene) colorants which are stable to basic amine catalyst. This allows one to more easily see changes in the actual foam shade. This also provides a reference point from which to determine the actual percentage of colorant lost during the test. Black colorant blends were prepared by mixing equal amounts of Reactint® Red X64 and Reactint® Yellow X15 (available from Milliken Chemical, Spartanburg, S.C.) with inventive examples 1–2.

In order to correct for varying color strengths, the colorants 1–2 were all cut to a consistent color value of 25 (abs/g/L in Methanol) with a polyester polyol diluent (Fomrez 11–225.TM. from Witco) prior to mixing with Reactint® Red X64 and Reactint® Yellow X15 referenced above. This was accomplished as follows.

First the color value for the colorants tested was determined by placing 0.15–0.20 grams of colorant into a 100 mL volumetric flask and adding approximately 40–50 mL of methanol. The flask was swirled until the colorant dissolved in the methanol, after which excess methanol was added to the 100 mL mark on the flask. The flask was stoppered and the contents were mixed and shaken. Exactly 2.0 mL of the solution of the colorant in methanol was then added to a separate 100 mL flask and the flask was filled with methanol to the 100 mL mark, stoppered and shaken.

A Beckman DU-650 Spectrophotometer was zeroed with methanol, filled with the test solution, and the solution was scanned from 300 to 750 mm. The maximum absorbance was recorded. The color value was obtained by multiplying the sample weight by 0.2 and dividing the result into the maximum absorbance value.

Standard polyurethane foams (to be used as reference foams) were prepared using the following procedure: Two parts of a colorant blend were added to 100 parts of ether triol (mw~3,000), which was mixed with 4.53 parts water, 1.0 part silicone surfactant, 0.15 parts stannous octoate catalyst (Dabco 33LV) and 0.60 parts triethylene diamine. Next, 58.8 parts toluene diisocyanate (80/20) was allowed to react at ambient conditions for approximately three minutes and allowed to cool. The foams were then cured in a microwave at 10% power for 10 minutes then in a 160 C oven for 3 minutes. A colored polyurethane foam having a density of 1.5 lbs./ft$^3$ was produced.

Test foams were made using the procedure described above except that the triethylamine diamine was replaced with either DABCO TL, DMEA, or ZF10. After the foams had cooled to room temperature, they were cut and an K/S spectral curve of the color of the center of the foam measured using a Hunter Color Computer. This spectra was compared to the K/S spectra from the center of the bun prepared using the same black colorant blend with triethylene diamine catalyst. By comparing the ratio of peak heights of the Blue peaks to that of the Red peaks in the foams for the standard catalyst (triethylene diamine) and the more basic amine catalyst, the % color loss can be determined. The results are shown in Table 2.

TABLE 1

COLORANT STABILITY TEST IN POLYURETHANE FOAM

| Example # | Aldehyde Component | Coupling Component | DMEA Catalyst % Color Lost | ZF10 Catalyst % Color Lost | DABCO TL Catalyst % Color Lost |
|---|---|---|---|---|---|
| Compare Example A | OFBSA | Aniline 2EO 13PO | 38 | 55 | 88 |
| Example 1 | OFBSA | Aniline 2TBGE 12 PO | 2 | 29 | 64 |
| Example 2 | OFBSA | Aniline 2EHGE 12 PO | 14 | 19 | 72 |

From the results in TABLE 1, it can be seen that the inventive colorants 1 & 2, showed a dramatic reduction in the amount of color lost in the presence of the highly basic amine catalyst compared to an analogous TPM colorant, comparative example A, containing EO directly bound to the amine nitrogen of the coupler. The amount of improvement varies depending on the catalyst used.

TABLE 2

COLORANT STABILITY ON LAUNDRY DETERGENTS

| Example # | Aldehyde Component | Coupling Component | % TPM Lost |
|---|---|---|---|
| Compare Example B | OFBSA | Aniline 10 EO | 25.7 |
| Compare Example C | OFBSA | MTol 10 EO | 41.0 |
| Compare Example D Xylene Cyanol FF | 1,3-benzene-disulfonic acid-4-formyl disodium salt | N-ethyl-ortho-toluidine | 80 |
| Comparative Example E Acid Violet 17 | N,N-diethyl-para-amino benzaldehyde | α-(N-ethylanilino)-m-toluenesulfonic acid | 100 |
| Example 3 | OFBSA | Aniline 2TBGE 10 EO | 8.8 |
| Example 4 | 1,3-benzene-disulfonic acid-4-formyl disodium salt | MTol 2TBGE 10 EO | |
| Example 5 | PFA 2TBGE 10 EO | MToluidine 2TBGE 10 EO | 1.7 |
| Example 6 | PFA 2iPRGE 8 EO | MTol 2iPRGE 8 EO | <1 |

From the results in TABLE 2, it can be seen that the inventive colorants (Examples 3–6) showed a significant and unexpected reduction in the amount of color lost on detergent compared to the comparative TPM colorants, Examples B–E. These dramatic improvements indeed are surprising—and unexpected.

The invention is shown by way of the specification and examples provided above. However, the scope and breadth of the invention is not limited by only these representative examples, and may apply to other similar examples within the scope and spirit of this disclosure.

What is claimed is:

1. A colorant composition comprising:

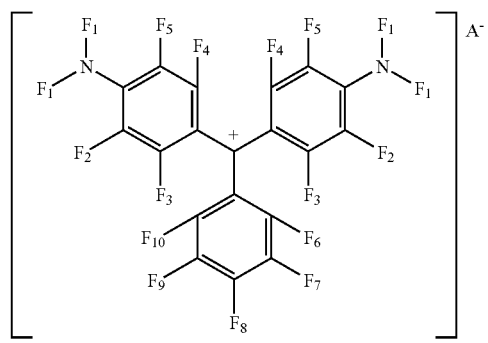

wherein said $F_1=(B)_x(C)_yH$, and
further wherein
H is hydrogen; and
B is an alkylene oxide residue, said alkylene oxide residue being selected from at least one of the following:
styrene oxide, glycidyl methyl ether, isobutyl glycidyl ether, isopropylglycidyl ether, t-butyl glycidyl ether, 2-ethylhexylglycidol ether, and glycidyl hexadecyl ether; and
x is an integer from 1–20 representing the number of repeat alkylene oxide units; and
C is an alkylene oxide residue selected from at least one of the following:
ethylene oxide, propylene oxide, butylene oxide, styrene oxide, glycidyl methyl ether, isobutyl glycidyl ether, isopropyl glycidyl ether, t-butyl glycidyl ether, 2-ethylhexylglycidol ether, and glycidyl hexadecyl ether, and
y is an integer less than about 20; and
$F_2$, $F_3$, $F_4$, $F_5$, $F_6$, $F_7$, $F_9$, and $F_{10}$ each are independently selected from: hydrogen, alkyl, alkoxy, $SO_3^-$, $SO_3Na$, $SO_3K$, sulfonamide, acetamide, nitro, and cyano; and
$F_8$ is selected from the group of: hydrogen, alkyl, alkoxy, $SO_3^-$, $SO_3Na$, $SO_3K$, sulfonamide, acetamide, nitro, and cyano, and nitrogen-bound alkylene oxide moiety;
said $F_6$ and said $F_7$ may optionally be linked together to form a heterocyclic or aromatic ring;
said $F_7$ and said $F_8$ may optionally be linked together to form a heterocyclic or aromatic ring; and
A– comprises an anion when said colorant composition does not contain $SO_3^-$.

2. The colorant composition of claim 1 wherein said $F_8$ comprises said nitrogen-bound alkylene oxide moiety, said nitrogen-bound moiety further comprising a structure represented by:

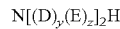

$N[(D)_y(E)_z]_2H$ wherein
N is nitrogen;
D represents an alkylene oxide residue, said alkylene oxide residue being selected from the group of:

styrene oxide, t-butyl glycidyl ether, isopropyl glycidyl ether, isobutyl glycidyl ether, 2-ethylhexyl glycidyl ether, glycidyl hexadecyl ether, and glycidyl methyl ether;

y is an integer between 1 and about 20; and

E represents an alkylene oxide residue selected from the group of: ethylene oxide, propylene oxide, butylene oxide, styrene oxide, t-butyl glycidyl ether, isopropyl glycidyl ether, isobutyl glycidyl ether, 2-ethylhexyl glycidyl ether, glycidyl hexadecyl ether, and glycidyl methyl ether; and z represents an integer less than about 20; and H is hydrogen.

3. The colorant composition of claim 1 comprising at least four terminal —OH groups, linked to the colorant through said respective $F_1$ total groups.

4. The colorant composition of claim 3 wherein at least one hydrogen of said terminal OH group(s) are substituted with one of the following:

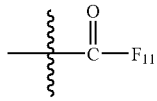

wherein $F_{11}$ is alkyl or

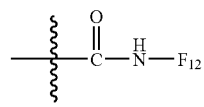

wherein $F_{12}$ is alkyl or aryl.

5. A polyurethane comprising the colorant composition of claim 1.

6. A polyurethane comprising the colorant composition of claim 2.

7. A polyurethane comprising the colorant composition of claim 3.

8. A polyurethane comprising the colorant composition of claim 4.

9. A detergent composition comprising the colorant composition of claim 1.

10. A detergent composition comprising the colorant composition of claim 2.

11. A detergent composition comprising the colorant composition of claim 3.

12. A detergent composition comprising the colorant composition of claim 4.

* * * * *